(12) United States Patent
Champion et al.

(10) Patent No.: US 7,908,920 B2
(45) Date of Patent: Mar. 22, 2011

(54) VELOCITY-OF-PROPAGATION FLUID LEVEL MEASUREMENT METHOD

(75) Inventors: James Robert Champion, Maryville, TN (US); William P. Schenk, Jr., Rockford, TN (US)

(73) Assignee: Robertshaw Controls Company, Carol Stream, IL (US)

( * ) Notice: Subject to any disclaimer, the term of this patent is extended or adjusted under 35 U.S.C. 154(b) by 349 days.

(21) Appl. No.: 11/952,722

(22) Filed: Dec. 7, 2007

(65) Prior Publication Data

US 2009/0145219 A1    Jun. 11, 2009

(51) Int. Cl.
*G01F 23/26* (2006.01)
(52) U.S. Cl. ...................................... 73/304 C
(58) Field of Classification Search .................. None
See application file for complete search history.

(56) References Cited

U.S. PATENT DOCUMENTS

| | | | | |
|---|---|---|---|---|
| 2,621,518 | A | * | 12/1952 | Sontheimer ............... 73/304 C |
| 3,745,829 | A | * | 7/1973 | Franchi ..................... 73/290 V |
| 5,457,990 | A | * | 10/1995 | Oswald et al. ............. 73/290 V |
| 5,898,308 | A | * | 4/1999 | Champion .................. 73/304 R |
| 6,067,673 | A | | 5/2000 | Paese et al. |
| 6,281,801 | B1 | * | 8/2001 | Cherry et al. ............... 73/61.41 |
| 2004/0046571 | A1 | | 3/2004 | Champion et al. |
| 2004/0046572 | A1 | | 3/2004 | Champion et al. |
| 2004/0059508 | A1 | | 3/2004 | Champion |
| 2005/0056090 | A1 | * | 3/2005 | McSheffrey et al. .......... 73/291 |

OTHER PUBLICATIONS

Brian C. Wadell, Transmission Line Design Handbook, book, 1991, 6 pages, front of book, copyright page, pp. 16-19.

* cited by examiner

*Primary Examiner* — Hezron Williams
*Assistant Examiner* — Alex Devito
(74) *Attorney, Agent, or Firm* — Reinhart Boerner Van Deuren P.C.

(57) ABSTRACT

An apparatus for determining a level of a liquid in a tank is provided. The apparatus comprises a probe and electronics. The probe passes into the tank and is immersed in the liquid. The probe includes a fiducial in spaced relation with a distal end. The electronics are operably coupled to the probe. The electronics include a signal generator propagating a signal along the probe and a signal receiver receiving the signal propagated along the probe. The electronics determine a velocity of propagation and/or an amount of time for the signal to travel between the fiducial and the distal end. The level of the liquid in the tank is then determined using the velocity of propagation and/or amount of time.

20 Claims, 3 Drawing Sheets

# VELOCITY-OF-PROPAGATION FLUID LEVEL MEASUREMENT METHOD

FIELD OF THE INVENTION

This invention generally relates to level sensors and, in particular, level sensors capable of determining a level of a low dielectric liquid in a tank.

BACKGROUND OF THE INVENTION

Measuring and/or monitoring a level of a liquid in a tank or tanks is a challenging task. One method of accomplishing this task is mechanical in nature. A spring biased mass is suspended within the tank and partially immersed in the liquid. Due to buoyancy, the effective weight of the mass is offset by the amount of the liquid held in the tank. The spring hanging in the tank is also magnetically coupled to a pointer through a brass pressure-sealing barrier. The pointer is generally associated with a scale read by sight. While the pointer does give an indication of the level of the liquid in the tank, the pointer is accurate to no better than about plus or minus ten percent (+/−10%). Therefore, the mechanical method of measuring and/or monitoring the level in the tank does not provide a particularly trustworthy reading.

Since the mechanical method was deficient, electrical methods of measuring the level of the fluid in the tank were attempted. For example, the use of a time domain reflectometry (TDR) system was explored. The conventional TDR system includes a probe which is inserted into the tank and immersed in the liquid. A signal generator in the TDR system generates a signal or pulse that propagates along the probe. When the signal reaches the air/liquid interface (i.e., the level of the liquid in the tank which is sometimes referred to as a dielectric mismatch boundary), the signal is reflected back toward a signal receiver. The signal receiver captures the reflected or return signal and transmits characteristics of that return signal to the TDR system. Using those characteristics, the TDR system is able to determine the level of the liquid in the tank.

Despite the success of the conventional TDR system, it was eventually discovered that some liquids commonly found or stored in tanks did not reflect signals very well. For example, liquids with a relatively low dielectric constant (i.e., permittivity) were only able to reflect a weak signal. If the signal was too weak, the TDR system was unable to accurately and/or reliably determine the level of the liquid in the tank. This limited the particular applications where the conventional TDR system was useful.

To solve the weak reflected or return signal problem experienced with low dielectric constant liquids, a modified bistatic radar was used. The radar employed a float coupler moveably disposed on the probe as disclosed in U.S. Pub. Applns. 2004/0046571 and 2004/0046572 to Champion, et al., and U.S. Pub. Appln. 2004/0059508 to Champion. The float coupler was buoyant upon the liquid and configured to reflect the signal by coupling of the two separate but parallel conductors. When the signal generator generated a signal, the signal propagated along the first conductor, passed through the float coupler floating on the surface of the liquid, and then propagated back up to the signal receiver. As a result, the TDR system was able to measure and/or monitor the level of the liquid in the tank despite the low dielectric constant liquid stored in the tank.

The modified bistatic radar employing the float coupler worked very well where the radar was provided ready access to the liquid in the tank. However, the modified bistatic radar was impractical in situations where pressurized and/or compressed low dielectric liquids were found. For example, carbon dioxide ($CO_2$), which has a relatively low dielectric constant of about one and six tenths (1.6), is often stored in a compressed and/or liquefied form in tanks, canisters, and the like, e.g. Dewar-type containers. Carbon dioxide is often used as an inexpensive, nonflammable pressurized gas to carbonate soft drinks and make seltzer, to inflate life jackets, to power paintball guns, to inflate bicycle tires, to oxidize metals in welding, to refrigerate foods, to remove caffeine from coffee, to extinguish fires, to remove oil from the underground, and the like. Indeed, the applications for carbon dioxide extend across a wide range.

High pressure tanks can store the product indefinitely. The insulated or Dewar-type containers hold the product at a lower pressure by having the contents at a low temperature as well. Particular gasses may be more suitable stored in one type of container or the other. By way of example and not of limitation, the following chart illustrates some common industrial liquefied gasses, their typical liquefied container, and the dielectric constant of the liquid gas:

| Common Industrial Liquefied Gasses | | |
| --- | --- | --- |
| Liquid gas | Typical Liquefied Container | Dielectric Constant |
| Propane | High Pressure | 1.6 |
| Butane | High Pressure | 1.4 |
| CO2 | High Pressure or Insulated | 1.6 (1.563) |
| Nitrogen | Insulated | 1.43 |
| Argon | Insulated | 1.5 |
| Chlorine | High Pressure | 2.1 |
| Oxygen | Insulated | 1.5 |
| Hydrogen | Insulated | 1.23 |
| Helium | Insulated | 1.05 |

Unfortunately, because carbon dioxide (and other liquid gasses) has a low dielectric constant and is stored in a compressed and/or pressurized state and in liquefied form, neither the conventional TDR or the improved bistatic radar system was well suited to determine the level of the carbon dioxide in tanks. The standard TDR system would not work well since the carbon dioxide possessed a low dielectric constant. Also, the bistatic radar approach was out since the liquefied carbon dioxide was a pressurized fluid and the tank most likely had only a small opening available for the probe. Trying to fit the probe including a probe coupler into the tank would have been impractical and difficult. Even if the probe and probe coupler could be squeezed through any available small opening, the size of the opening would have placed restrictions on the size of the probe. This would probably negatively affect the operation of the improved bistatic radar system. Moreover, many tanks had internal features on which a moving float coupler would likely get hung up.

Because many customers would like to be able to electrically read the level of the liquefied carbon dioxide (so they can convey that reading via, for example, a radio, phone, and/or network a central billing office, a dispatch office, and the like) an improved apparatus for and method of measuring and/or monitoring the level of liquefied carbon dioxide in a tank would be desirable. The invention provides such an apparatus and method. These and other advantages of the invention, as well as additional inventive features, will be apparent from the description of the invention provided herein.

BRIEF SUMMARY OF THE INVENTION

An apparatus for, and method of, accurately determining a level of a low dielectric liquid, such as carbon dioxide, in a tank by measuring a velocity of propagation of a signal traveling along a probe immersed in the liquid is provided.

The velocity of propagation relies on the knowledge that a signal will propagate through liquid more slowly than it will propagate through air. By monitoring a delay time for the signal to travel between known points on the probe, the level and/or depth of the liquid in the tank can be determined. In fact, it has been recognized that the delay time is directly proportional and/or linearly related to the level of the liquid.

The velocity of propagation technique is particularly suited for compressed or pressurized liquids that have a low dielectric constant. Also, because the velocity of propagation apparatus and method are electrical in nature, the level of the liquid in the tank can be easily relayed and reported to a central billing/dispatch office.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
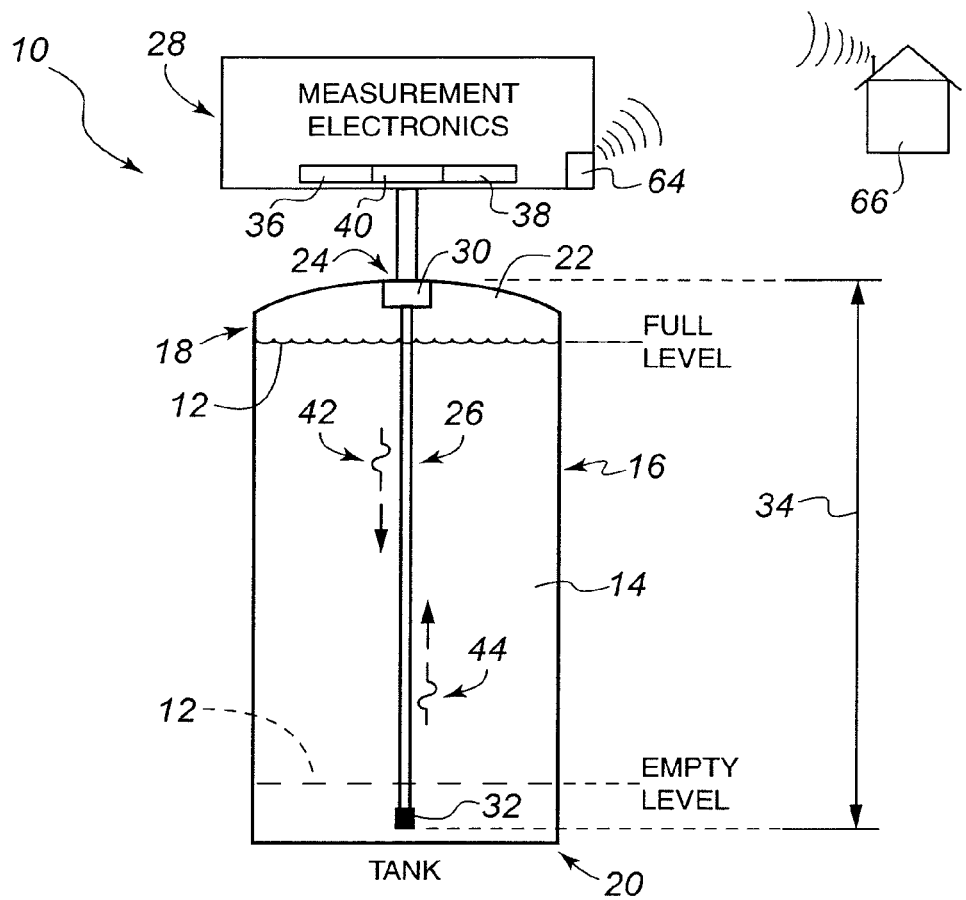
FIG. 1 is a simplified schematic view of an exemplary embodiment of an apparatus including a probe monitored by electronics and constructed in accordance with the teachings of the present invention.

Referring to FIG. 1, an apparatus 10 for determining a level 12 of a liquid 14 in a tank 16 is illustrated. As the liquid 14 is either expelled from or introduced into the tank 16, the level 12 of the liquid 14 generally transitions from between a "full level" position proximate a top portion 18 of the tank 16 to an "empty level" position (shown in dashed lines) proximate the bottom portion 20 of the tank. Above the full level, the tank 16 typically holds a gas such as, for example, vapor 22. The vapor 22 can be compressed and/or pressurized to ensure that the liquid 14 in the tank is maintained in liquid form, is discharged from the tank 16 under pressure when desired, and the like.

The liquid 14 in the tank 16 has a relatively low dielectric constant or permittivity relative to the dielectric constant of a vacuum at room temperature which is, by definition, one (1). In many cases, the liquid 14 in the tank has a dielectric constant of below about 2, or even around about 2.6. With higher dielectric constants (about, e.g., higher than 5) the return signal from the vapor/fluid interface starts to become significant enough that the standard TDR type products in the market begin to work well without special adaptations (like coaxial probes, AGC controlled detection circuits, floats to create a "target" etc).

In one embodiment, the liquid 14 in the tank 16 is a liquefied carbon dioxide ($CO_2$). As well known by those skilled in the art, carbon dioxide is often stored as a liquid for subsequent use as an inexpensive, nonflammable pressurized gas. For example, carbon dioxide can be utilized to carbonate soft drinks and make seltzer, to inflate life jackets, to power paintball guns, to inflate bicycle tires, to oxidize metals in welding, to refrigerate foods, to remove caffeine from coffee, to extinguish fires, to remove oil from the underground, and the like. Carbon dioxide has a relatively low dielectric constant of below about two (2) and, more specifically, about one and six tenths (1.6).

In addition to having a relatively low dielectric constant, the liquid 14 in the tank 16 preferably has a fixed, non-varying dielectric constant. The liquid 14 is also typically non-ferrous and, therefore, has a relative permeability of about one (1).

The tank 16 can be a variety of different devices configured to hold a liquid and/or gas. For example, the tank 16 can be a storage tank, vessel, canister, bottle, and the like. The tank 16 is generally designed to hold the liquid 14 in a pressurized and/or compressed condition such that a liquefied state is maintained. In that regard, the walls of the tank 16 are typically robust or thermally insulated and the number of openings in the tank are kept to as few as possible. As illustrated in FIG. 1, a single central aperture 24 is formed in the top portion 18 of the tank 16.

The apparatus 10 shown disposed upon and extending inside the tank 16 comprises a probe 26 and electronics 28. The probe 26 generally passes into the tank 16 through the central aperture 24 and is immersed, at least in part, in the liquid 14 stored therein. The probe 26 is adapted and configured to operate in and around the liquid 14 having the characteristics noted above.

The probe 26 is configured to permit a signal to propagate along its length 34 between a fiducial 30 and a distal end 32. As shown in FIG. 1, the fiducial 30 is in spaced relation with, and disposed vertically above, the distal end 32. Because the probe 26 is a non-shielded or open transmission line, the signal travels along the probe 26 in contact with or proximate to the liquid 14. In one embodiment, the probe 26 is specifically calibrated for the particular liquid 14 in the tank 16 prior to installation.

The electronics 28 are operably coupled to the probe 26. The electronics comprise a signal generator 36, a signal receiver 38, and a microprocessor 40. The signal generator 36 is configured to generate an electromagnetic signal 42 that propagates along at least a portion of the length 34 of the probe 26. The signal receiver 38 is configured to receive a return signal 44 (a.k.a., a reflected signal) that propagates along at least a portion of the length 34 of the probe 26. In one embodiment, the signal 42 travels away from the fiducial 30 and the return signal 44 travels towards the fiducial 30.

It should be noted that in some embodiments of the present invention, the fiducial 30 is ignored and the end-of-probe time is measured from the end-of-reset (i.e. a signal internal to the electronics that resets a delay circuit that controls the detection circuit). In either such embodiments, a pre-stored, or calibrated "time-to-probe-end-empty-measurement" is subtracted from the "current-position-of-probe-end measurement" to create a delta-t reading that indicates the level. However, for ease of understanding herein, measurements from either the fiducial 30 or the end-of-reset will be referred to as measurement from the fiducial.

The microprocessor 40 or other logic device is generally capable of conducting logic operations and/or executing instructions. The microprocessor 40 is configured to, among other things, measure and/or determine a velocity of propagation of one or more of the signals 42, 44. As will be more fully explained below, the calculated and/or measured velocity of propagation is used by the apparatus 10 to accurately and/or reliably determine the level 12 of liquid 14 in the tank 16.

To begin, the idea or possibility of using the velocity of propagation of signals was first conceived during the development of other related systems for measuring the level of the liquid in the tank. At that time, it was observed that objects (e.g., a hand, a laminate/wood bench top, etc.) coming near to the probe distorted the level measurement. This effect was due to the dielectric constant of the nearby object affecting the velocity of propagation of the signal being propagated up and down the probe. The closer the object was to the probe, the more the measured level of the liquid was skewed. Likewise, the more the dielectric constant of the object differed from that of the liquid, the more the measured level differed from the actual level. As a result, the apparatus 10 for determining the level 12 of the liquid 14 in the tank 16 was developed based upon this change in propagation velocity phenomenon.

The theory of the velocity of propagation technique is explained in detail with reference to FIGS. 1 and 2. When the tank 16 is filled with vapor 22 and a low dielectric constant liquid 14 such as carbon dioxide, a signal propagating along the probe 26 (i.e., the transmission line) will provide full and empty signal responses 46, 48 much like the signal responses shown in FIG. 2. As previously noted, the signal responses 46, 48 in FIG. 2 are expected, not measured, signals.

With reference to the full signal response 46, when the level 12 of the tank is at the full level, the signal 42 traveling down the probe 26 generates a fiducial waveform 50 when the signal encounters the fiducial 30. The fiducial 30 may arise from deliberate means (a change in probe impedance or coupling between the elements) or arise from normal means (pressure vessel sealing or probe through-the-tank-wall mounting that causes a change in probe coupling resulting in a fiducial-like signal). Continuing, when the signal 42 encounters the level 12 of the liquid 14 in the tank 16 (i.e., the vapor 22/liquid 14 interface or dielectric mismatch boundary), the signal produces a gas/liquid waveform 52 within the full signal response 46. Because of the relatively low dielectric constant of the liquid 14, only a small portion of the signal 42 is reflected back toward the signal receiver 38 and the gas/liquid waveform 52 is relatively weak. The small portion of the signal 42 that is reflected back toward the signal generator 38 is generally not enough to provide an accurate and/or reliable measurement of the level 12 in the tank without more complex detection means. The greater portion of the signal 42 travels through the vapor 22/liquid 14 interface at the level 12 and continues to travel along the probe 26.

When the signal 42 reaches the distal end 32 of the probe 26, a probe end waveform 54 is generated from the remaining energy of the full signal response 46 present at the distal end 32. If the dielectric constant of the fluid is low, the probe end waveform 54 will be much larger than the gas/liquid waveform 52 as illustrated. At the distal end 32, the signal 42 is reflected and becomes the return signal 44. The return signal 44 travels toward the signal receiver 38 where each of the waveforms 50, 52, 54 is received.

Figure 2:
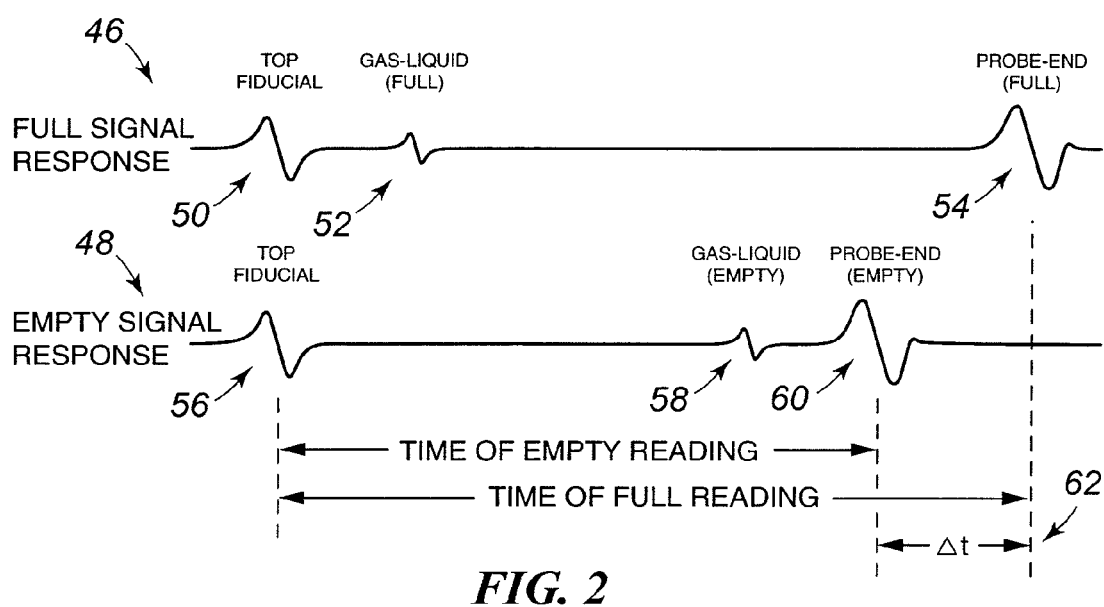
FIG. 2 is a representation of expected signal responses for signals propagating along the probe of FIG. 1.

As will now be apparent to those skilled in the art from the foregoing description and an analysis of the FIG. 2 waveforms, the closest that the gas/liquid signal comes to the probe-end signal is when the tank is (near) empty (in a completely empty tank, they would merge). This is also the soonest time at which a set-probe-length in an application would ever expect to see an end-of-probe-signal. Knowing this, an application calibration would be set to ignore any pulse that occurred before this time. Even the fiducial 30 could be ignored if timing was based on the end-of-reset signal edge. Any signal that occurs after this minimum-valid-end-pulse-time is the end of the probe.

Still referring to FIG. 2, with reference to the empty signal response 48, when the level 12 of the tank is at the empty level (shown by dashed lines in FIG. 1), the signal traveling down the probe 26 generates a fiducial waveform 56 when the signal encounters the fiducial 30. Continuing, when the signal 42 encounters the level 12 of the liquid 14 in the tank 16 (i.e., the vapor 22/liquid 14 interface or dielectric mismatch boundary), the signal produces a gas/liquid waveform 58 within the empty signal response 48. Because of the relatively low dielectric constant of the liquid 14, only a small portion of the signal 42 is reflected back toward the signal receiver 38 and the gas/liquid waveform 58 is relatively weak. As before, the small portion of the signal 42 that is reflected is generally not enough to provide an accurate and/or reliable measurement of the level 12 in the tank without more complex detection means. The greater portion of the signal 42 travels through the vapor 22/liquid 14 interface at the level 12 and continues to travel along the probe 26.

In comparing the full signal response 46 to the empty signal response 48 of FIG. 2, it is noted that the gas/liquid waveform 58 of the empty signal response occurs much later in time than the gas/liquid waveform 52 during the full signal response. This is because the signal 42 has to propagate further along the probe 26 to reach the level 12, as shown in FIG. 1, when the tank 16 is relatively empty.

Once again, when the signal 42 reaches the distal end 32 of the probe 26, a probe end waveform 60 is generated from the remaining energy of the empty signal response 48. As illustrated, the probe end waveform 60 is much larger than the gas/liquid waveform 58. As before, at the distal end 32 the signal 42 is reflected to become the return signal 44. The return signal 44 travels toward the signal receiver 38 where each of the waveforms 56, 58, 60 is received.

In reviewing both the full and empty signal responses 46, 48 it quickly becomes evident that the signal took more time to travel to the distal end 32 of the probe 26 when the tank 16 was full of the liquid 14 as opposed to when the tank was relatively empty. This is because the signal propagates at a slower velocity through the liquid 14 compared to the vapor 22. As a result, the probe end waveform 54 takes longer to appear when the tank 14 is full. The delayed appearance of the probe end waveform 54 when the tank 16 is full makes it seem as if the probe 26 has grown longer when, in fact, the length 34 of the probe has remained the same.

In light of the above, it was recognized that the propagation velocity of a signal through a medium is governed by the equation:

$$V_p = \frac{c}{(u_r \varepsilon_r)^{1/2}}$$

where "c" is the velocity of light (e.g., $3 \times 10^8$ meters/second), "$u_r$" is the relative permeability of the medium compared to the permeability of free space, and "$\varepsilon_r$" is the "effective" dielectric constant of the dielectric in the transmission line.

In the present application, the term "effective" dielectric constant is used because the electric field of a signal on an open, non-shielded transmission line travels through both the dielectric of the line and the surrounding medium such as the vapor 22 and the liquid 14 when the probe 26 is immersed in the tank 16. In a system where the signal response is obtained using equivalent-time-sampling techniques, "c" would be an equivalent-time speed of light given the sampling rate of the system. Also, "$u_r$", which is the capability of storing energy in a magnetic field, was assigned a value of one (1) since the liquid 14 is generally non-ferrous in nature. Therefore, the above-noted equation simplifies to:

$$V_p = \frac{c}{(\varepsilon_r)^{1/2}}$$

In addition to the above-noted formula, velocity can also be described as a distance traveled over time, or:

$$V = \frac{d}{t}$$

Referring to FIGS. 1 and 2, a change in level from "full" to "empty" results in a change in position of the end of the pulse. This change is position correlates to a difference in time that has been denoted ($\Delta t$) 62 in FIG. 2. Equating the two velocity equations, substituting the phrase "change in level" for "d" and the difference in time ($\Delta t$) 62 for "t", and finally doing some rearranging of the terms, the following equation is obtained:

$$\text{Change in level} = \Delta t \times \left[ \frac{c}{(\varepsilon_r)^{1/2}} \right]$$

In a liquid with a non-varying dielectric constant, the bracketed portion of the "change in level" equation is a constant. As a result, the change in level is directly proportional and/or linear with respect to the change in time. Knowing this, the amount of time required for a signal to travel from the fiducial 30 to the distal end 32 (i.e., the delay time) can be correlated to a level 12 of the liquid 14 in the tank 16. As those skilled in the art will now recognize, using this phenomenon the level 12 of the liquid 14 in the tank 16 is measured without having to reflect the signal 42 off the vapor 22/liquid 14 interface. Therefore, the apparatus 10 is able to determine the level 12 of liquids even when those liquids have a low dielectric constant.

In order to take advantage of the level measurement determined via the velocity of propagation technique, in one embodiment the electronics 28 include a variety of electronic components and/or peripheral devices 64, which are shown in simplified schematic form in FIG. 1. The peripheral devices 64 can include equipment such as memory, software, a display, an input device (e.g., a keypad), a phone and a phone line, a radio transmitter and receiver for wireless communication, and the like. The electronics 28 can be coupled to and communicate through one or more networks including the Internet. As such, information regarding the level 12 of liquid 14 in the tank 16 can be readily and easily relayed from place to place.

As a result of including the peripheral devices 64 in the electronics 28, a user of the apparatus 10 can be informed of the level 12 of liquid 14 in the tank 16 via a phone, cell phone, radio, personal computer, wireless device, instant message, and/or an electronic mail message. In one embodiment, the level 12 of liquid 14 in the tank 16 can be relayed to a billing office 66, a dispatch office, and the like.

Figure 3:
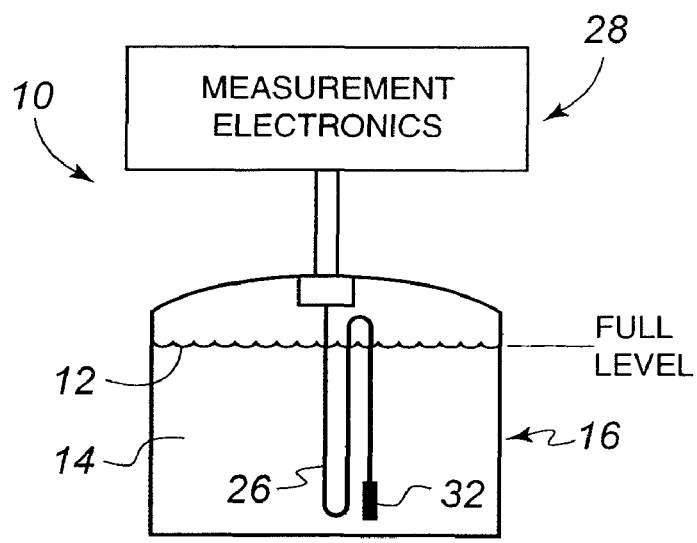
FIG. 3 is one embodiment of the apparatus of FIG. 1 employing a folded probe.

While the apparatus 10 of FIG. 1 is suitable for use in most applications, some particularly challenging situations might require modifications. For example, in a pulse response measurement system it is generally desirable to have the length of the probe be much, much greater than the transmitted pulse width. If an apparatus (such as apparatus 10) is coupled to a shallow tank, this may be difficult. One solution is to create transmitted pulse widths with a faster rise time. Another solution is to position the probe diagonally across the tank. Still further, another remedy involves folding the probe 26 as illustrated in FIG. 3.

The option of folding the probe 26 is only available because the apparatus 10 depends on the pulse response (i.e., waveform) from the distal end 32 of the probe and not the reflected pulse response from the level 12 of the liquid 14. If the folded probe approach is used, the probe 26 should be folded such that equal length amounts of the probe are exposed between the full and empty level of the tank to keep the fill-level-to-time-response linear.

Figure 4:
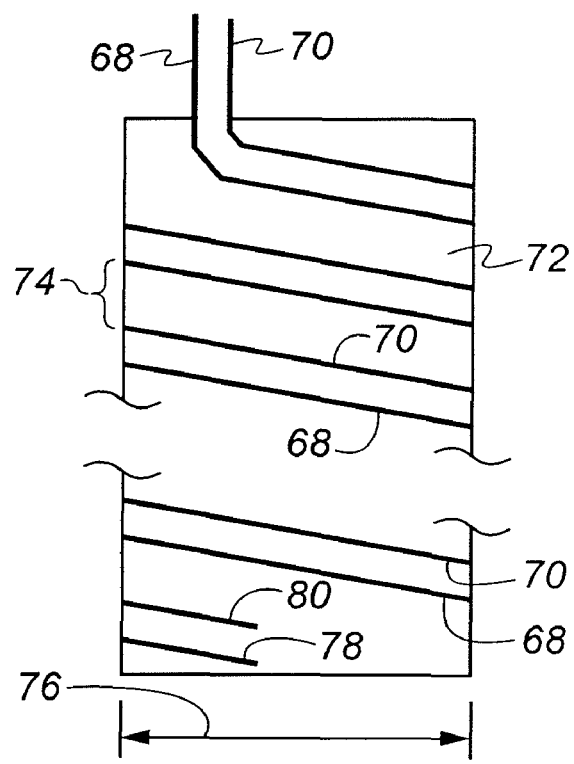
FIG. 4 is a spiral probe for use with the apparatus of FIG. 1.

In one embodiment as illustrated in FIG. 4, the probe 26 is wound in a spiral or helical fashion to achieve an electrically longer probe. As shown, the probe 26 in FIG. 4 is a bistatic probe formed from first and second conductors 68, 70 in parallel spaced relation that have been wrapped around a generally cylindrical form 72. Preferably, adjacent windings of the parallel first and second conductors 68, 70 on the form 72 would be separated by a predetermined or desired distance 74. This would ensure that primary coupling and transmission line effects would be dominated by coupling to the adjacent conductor on the same wind. In addition, it would be desirable to maintain the diameter 76 of the form 72 small to reduce the static dielectric presented to the probe 26 by the form.

Still referring to FIG. 4, the delay of a signal down the probe 26 in a spiral shape is similar to the delay experienced when the probe is mounted diagonally in the tank 16. If, for example, the probe 26 is wound with a 10 degree angle (or pitch), then the velocity of the signal over the spiral probe will be about 0.17365 times the velocity of the signal over the normal probe. Additional velocity of propagation delay affects may be presented by the nearby presence of adjacent turns of the probe 26 and the form 72 on which the probe is wound.

When using the probe 26 illustrated in FIG. 4, the ends 78, 80 of the first and second conductors 68, 70 may be left open or shorted together. Open conductors will give an end response of high impedance. Shorted conductors will give an end response of low impedance. The condition of the ends 78, 80 will determine the direction of the signal response. Therefore, the method by which the signal is detected at the ends 78, 80 may determine if the probe end is left open or shorted.

Figure 5:
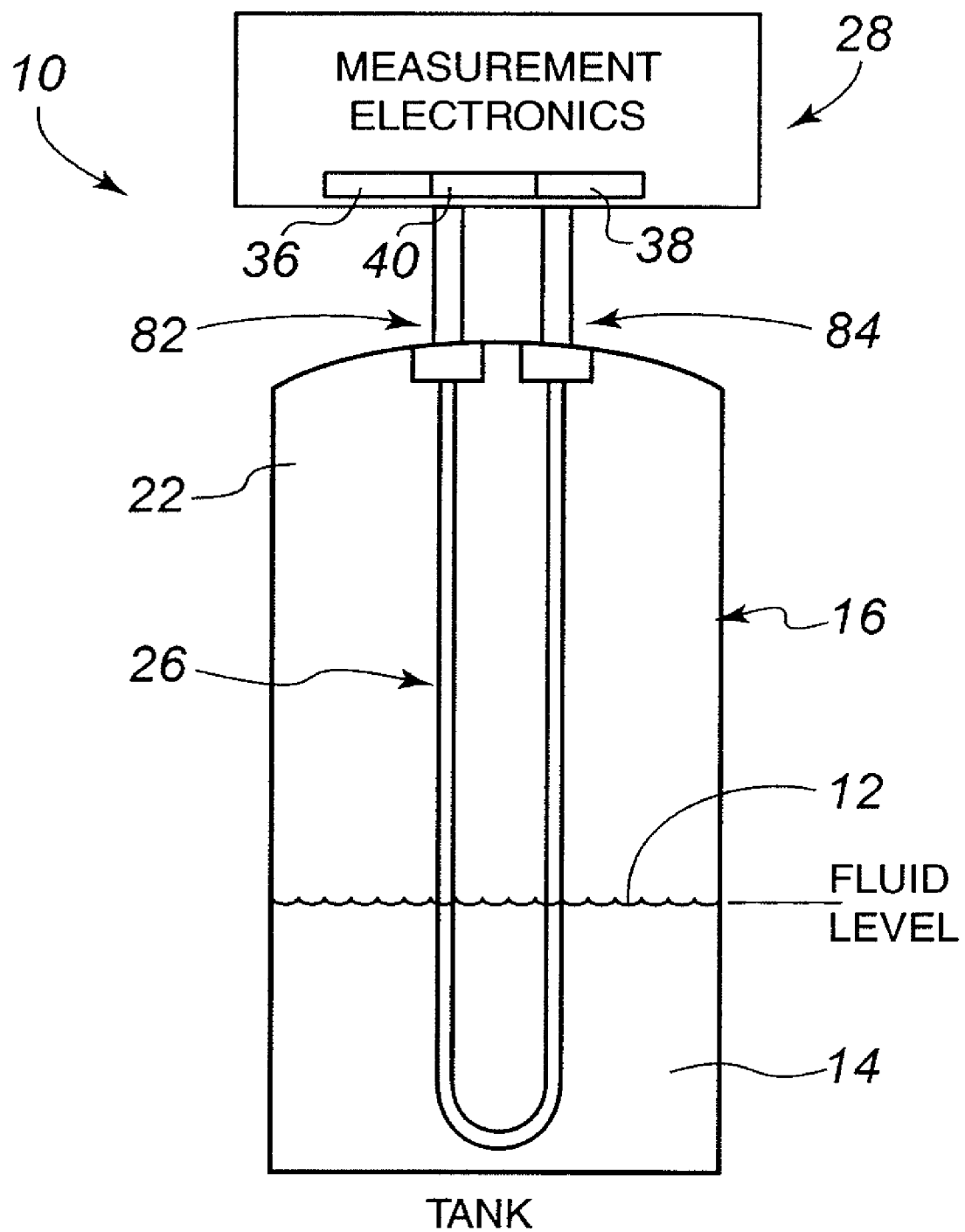
FIG. 5 is an embodiment of the apparatus of FIG. 1 employing a double-ended probe.

In one embodiment, the probe 26 is a bistatic probe as illustrated in FIG. 5. The bistatic probe includes one transmit conductor 82 and one receive conductor 84, each of which is operably coupled to opposing ends of the probe 26. Here, the electronics 28 generally measure the time it takes the signal to propagate from the transmit conductor 82 to the receive conductor 84.

In operation and generally referring to FIG. 1, the apparatus 10 first calls upon the signal generator 26 in the electronics 28 to generate the signal 42. As shown by way of the illustrative example in FIG. 2, when the tank is full the signal 42 initially passes by the fiducial 30 and produces the fiducial waveform 50. As the signal 42 continues to propagate along the probe 26, the signal encounters the vapor 22/liquid 14 interface (i.e., the level 12 of the liquid) and generates the relatively weak gas/liquid waveform 52. Despite impacting the level 12 of the fluid 14, the propagating signal 42 continues to travel along the probe 26 toward the bottom portion 20 of the tank 16. When the signal 42 reaches the distal end 32 of the probe 26, the signal generates the probe end waveform 54. Thereafter, the signal 42 is reflected by the distal end 32 and becomes the return signal 44. The return signal 44 travels back up toward the electronics 28 where it is received by the signal receiver 38. From there, the microprocessor 40 is able to determine, knowing the speed that the signal will travel in both the vapor 22 and the liquid 14, the particular level 12 of the liquid 14 in the tank which, in this case, is at the full level.

If desired, the probe 26 can be calibrated in the tank 16 by propagating a signal on the probe between the fiducial and the distal end when the tank is empty and again when the tank is full as illustrated in FIG. 1. Knowing the velocity of propagation at both the empty and full levels permits any level between empty and full to be determined by correlation and/or interpolation.

If desired, the microprocessor 40 can utilize the peripheral devices 64 to relay the signal to a user, to a billing office 66, through a network, and the like. The measured level 14 can be displayed electronically in a variety of different formats. The information regarding the measured level 14 can also be relayed to a user via at least one of a phone, a radio, a personal computer, a wireless device, an instant message, an electronic mail message, and the like.

From the foregoing, those skilled in the art will appreciate that the velocity of propagation method or technique is particularly useful in numerous applications and can be modified to accommodate diverse circumstances. The apparatus 10 is particularly valuable where the fluid being measured has a low dielectric constant. The apparatus 10 is also particularly suited for those applications where the liquid 14 is pressurized and/or compressed in the tank 16. Also, even though the dielectric constant of the liquid 14 is low, a detectable pulse return from the distal end 32 of the probe 26 can be detected at all fluid levels. In addition, the length of the probe 26 is fixed when the probe is manufactured. As such, the length of the probe does not need to be subsequently altered and then calibrated for that new length based upon the particular application. Further, the velocity of propagation approach eliminates the need for a float coupler in order to measure low dielectric fluids. The apparatus does not measure where the fluid surface is. Instead, it measures where the end of the probe appears to be. The measurement technique is not dependent upon measuring the return from the vapor/fluid interface return, items 52 and 58 in FIG. 2.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. An apparatus for determining a level of a liquid in a tank, the apparatus comprising:
    a probe configured to be passed into the tank and immersed in the liquid, the probe including a fiducial in spaced relation with a distal end; and
    electronics operably coupled to the probe, the electronics including a signal generator for propagating a signal along the probe and a signal receiver for receiving the signal propagated along the probe, the electronics programmed to determine an amount of time for the signal to propagate between the fiducial and the distal end without consideration of any reflected signal at an air/liquid interface of the liquid in the tank between the fiducial and the distal end of the probe, the amount of time used to determine the level of the liquid in the tank.

2. The apparatus of claim 1, wherein probe is operable when the liquid in the tank is compressed liquefied gas.

3. The apparatus of claim 1, wherein the probe is operable when the liquid has a generally fixed, non-varying dielectric constant.

4. The apparatus of claim 1, wherein the probe is operable when the liquid is non-ferrous.

5. The apparatus of claim 1, wherein the probe has a shape selected from the group consisting of folded, spiral, and double ended.

6. The apparatus of claim 1, wherein the probe is operably coupled to a transmit conductor and a receive conductor.

7. A method of determining a level of a liquid in a tank using a probe immersed in the liquid, the probe having a fiducial and a distal end, the method comprising the steps of:
    propagating a signal on the probe between the fiducial and the distal end;
    measuring an amount of time for the signal to propagate between the fiducial and distal end without consideration of any reflected signal at an air/liquid interface of the liquid in the tank between the fiducial and the distal end of the probe; and
    determining the level of the liquid in the tank using the measured amount of time.

8. The method of claim 7, wherein the method further comprises the step of propagating a calibration signal on the probe between the fiducial and the distal end when the tank is empty and again when the tank is full to calibrate the probe.

9. The method of claim 7, wherein the determining step is performed using the relationship:

$$d = \Delta t \times \left[\frac{c}{(\varepsilon)^{1/2}}\right].$$

10. The method of claim 7, wherein the waveforms are a fiducial waveform and a distal end waveform.

11. The method of claim 7, wherein the signal is propagated through carbon dioxide having a fixed, non-varying dielectric constant during the propagating step.

12. The method of claim 7, wherein the method further comprises the step of relaying the level of the liquid in the tank over a network.

13. The method of claim 7, wherein the method further comprises the step of calibrating the probe for the liquid prior to the probe being immersed in the liquid.

14. The method of claim 7, wherein the signal is propagated along at least one of a folded, spiral, and double ended probe during the propagating step.

15. A method of determining a level of a liquid in a tank using a probe immersed in the liquid, the probe having a fiducial and a distal end, the method comprising the steps of:
propagating a signal on the probe between the fiducial and the distal end to generate a fiducial waveform and a distal end waveform;
measuring an amount of time between when the signal generated the fiducial waveform and when the signal generated the distal end waveform without consideration of any reflected signal at an air/liquid interface of the liquid in the tank between the fiducial and the distal end of the probe; and
determining the level of the liquid in the tank using the amount of time.

16. The method of claim 15, wherein the signal is propagated through compressed liquefied gas having a fixed, non-varying dielectric constant during the propagating step.

17. The method of claim 15, wherein the method further comprises the step of relaying the level of liquid in the tank to at least one of a billing office and a dispatch office.

18. The method of claim 15, wherein the method further comprises the step of relaying the level of the liquid in the tank through a network.

19. The method of claim 15, wherein the method further comprises the step of informing a user of the level of the liquid in the tank via at least one of a phone, a radio, a personal computer, a wireless device, an instant message, and an electronic mail message.

20. The method of claim 15, wherein the method further comprises electronically displaying the level of the liquid in the tank.

* * * * *